(No Model.)
W. W. DOOLITTLE.
BACK PRESSURE VALVE.
No. 486,950. Patented Nov. 29, 1892.
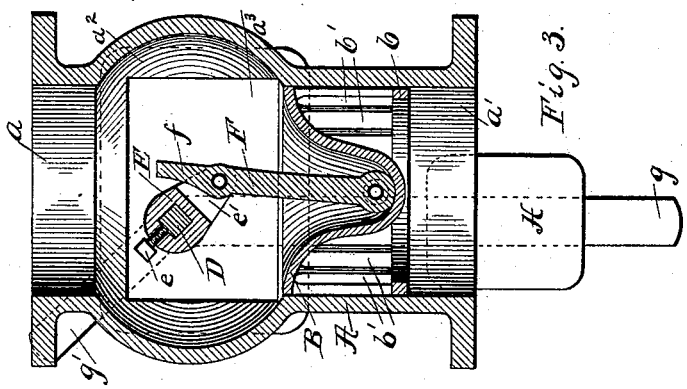
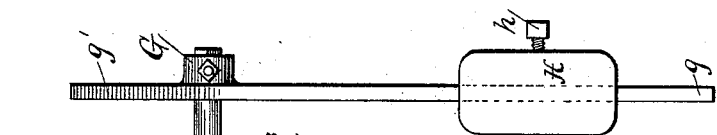
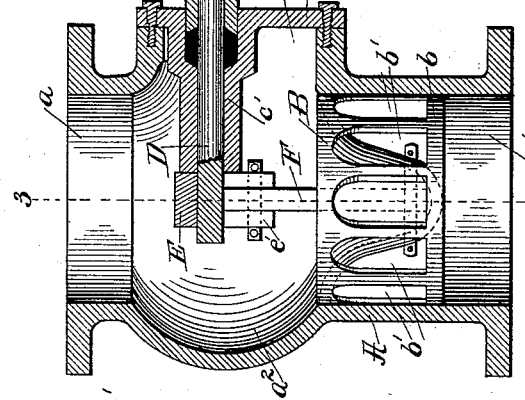
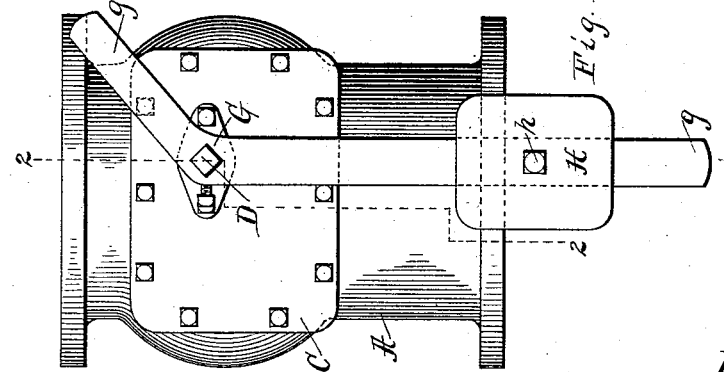
Witnesses
W. C. Corliss
J. W. Adams
Inventor
William W. Doolittle
By Coburn & Thacher
Att'ys.

UNITED STATES PATENT OFFICE.

WILLIAM W. DOOLITTLE, OF CHICAGO, ILLINOIS, ASSIGNOR TO THE CRANE COMPANY, OF SAME PLACE.

BACK-PRESSURE VALVE.

SPECIFICATION forming part of Letters Patent No. 486,950, dated November 29, 1892.

Application filed July 9, 1892. Serial No. 439,483. (No model.)

*To all whom it may concern:*

Be it known that I, WILLIAM W. DOOLITTLE, a citizen of the United States, residing at Chicago, in the county of Cook and State of Illinois, have invented a certain new and useful Improvement in Back-Pressure Valves, which is fully set forth in the following specification, reference being had to the accompanying drawings, in which—

Figure 1 represents a side elevation of a valve embodying my invention; Fig. 2, a section of the same, taken on the line 2 2 of Fig. 1; Fig. 3, a similar section taken on the line 3 3 of Fig. 2, and Fig. 4 a bottom plan of the valve itself detached.

My invention relates to back-pressure valves which are intended to be held in closed position by a weighted lever; and the improvement consists in constructing and arranging the parts so that when the valve is closed the weighted lever will always hang vertically, thus obviating the necessity of stops or other like devices.

I will now describe in detail the construction and operation of a valve device embodying my improvement in a practical way, and will then more definitely specify in the claims the particular improvements which I believe to be new and wish to secure by Letters Patent.

In the drawings, A represents a valve-case of any ordinary construction. As here shown it is of general circular form provided with round apertures $a$ and $a'$ at the upper and lower ends of the casing, respectively, while between the two there is an enlargement to provide a chamber $a^2$ of somewhat-larger circumference. The valve B is of the piston type and is fitted within the lower opening $a'$ of the case. The valve is not seated in the usual sense within the case, but it is cup-shaped, and its exterior or cylindrical rim $b$ is provided with a series of openings or slots $b'$, whereby passages to the central chamber in the casing are opened or closed, according to the position of the valve. At one side of the casing there is an opening $a^3$, and a head C, adapted to close this opening, is properly secured to the casing, as seen in Fig. 2. This head is provided with an arm or stud $c$, extending inward from the plate into the central chamber of the casing. The stud is bored to provide a bearing for a shaft D, which is mounted therein, being extended inward from the outside and through the stud. A stuffing-box is provided in the latter, if required. At the inner end of the shaft, projecting from the inner end of the stud, there is a short crank-arm E, fixed upon a shaft by means of a set-screw $e$ or any other suitable device. The outer or free end of this crank-arm is connected by a link-rod F to the valve B, being pivoted to each at its respective ends, as seen in Fig. 3. As shown by the drawings, the outer end of the crank-arm is forked, and the upper end of the link is pivoted between the two arms $e'$ of the fork, the upper end $f$ of the link-rod extending upward slightly above the pivot and past the center of the solid portion of the crank-arm, as seen in Fig. 3. A lever G is secured by any suitable device on the outer end of the shaft D outside of the casing. This lever is preferably bent, being provided with a long arm $g$ and a short arm $g'$, standing at an angle to the fork, and the lever is secured to the shaft at the angle of these two arms, as seen in Fig. 1.

Now the parts described above are so constructed and arranged relatively to each other that when the lever stands with its long arm depending vertically from the shaft, as seen in Fig. 1, the valve always will be closed. A weight H is applied to the long arm of the lever and obviously will have a tendency to bring this arm of the lever to this vertical position, and, as seen in Fig. 1, this weight is made adjustable on the arm and secured in any position by means of a set-screw $h$ or any other suitable device.

In operation it is obvious under all ordinary circumstances that the long arm of the lever will be returned to its vertical position automatically by the action of its weight, and in this position it will also keep the valve closed. Whenever the pressure upon the valve becomes excessive, however, and so requires relief, the valve will be lifted against the action of the weighted lever until passages are made for the escape of steam into the chamber above. As the pressure is thus diminished the weighted lever will automatically drop into a vertical position again, thus closing the valve. Owing to this arrangement and operation of the weighted lever, there is no necessity for any special device for stopping the lever at any point or at the point desired. It takes and keeps the position required for holding the valve closed naturally and without any stop device and moves from this perpendicular position with the change of the pressure of steam on the valve.

If at any time it is desired to hold the valve open, the weight is shifted from the long arm to the short arm of the lever, when the latter will operate to hold the valve in an elevated or open position. In carrying out this improvement I arrange the lever-shaft in a vertical plane as near to the vertical plane of the two pivots of the link-rod as possible and give room for the working of the parts. This arrangement is such that the joints form a kind of toggle in which the joints are approximately in line when the valve is fully closed, as seen in Fig. 3. Now in this position the leverage of the link upon the shaft is least, and consequently the weighted lever is not more readily moved by comparatively-small changes in pressure upon the valve. It will be seen, however, that as soon as the valve moves upward, thereby carrying the link in the same direction, the leverage on the link of the shaft will be increased, but at the same time, the weighted lever being carried out from its vertical position by the turning of the shaft, its resistance to such movement of the latter will be increased. These two forces act as a kind of balance to each other and operate to maintain a substantially-uniform resistance to the upward movement of the valve. With this construction, however, it will be impossible to bring the joints directly in line and so close the toggle, when of course the device would be held at rest and inoperative until the toggle is broken. The danger of this accident, however, is obviated by the extension of the upper end of the link, as heretofore described, as this projection will be brought in contact with the hub before the joints are brought into line, and so the closing of the toggle is impossible.

In details of construction changes may be made from those shown in the drawings, the main feature of my invention being the relative arrangement of the parts under which the weighted lever always drops to the vertical position to close the valve and retain it in this adjustment.

Having thus described my invention, what I claim as new, and desire to secure by Letters Patent, is—

1. In a back-pressure valve, a piston-valve, in combination with a shaft mounted in the case, a link-rod hinged to one end to the valve and at the other to the shaft eccentrically to the axis thereof, and a weighted lever mounted on a fixed shaft outside the case and arranged to close the valve when standing in a vertical position, substantially as described.

2. The valve-case A, in combination with the piston-valve B, freely rocking shaft D, the crank-arm E of the inner end thereof, the link-rod F, hinged, respectively, to the valve and crank-arm and with joints arranged to form a toggle, and the weighted lever G, attached to said shaft, substantially as described.

3. The valve-case A, in combination with a piston-valve B, the freely-rocking shaft D, the forked crank-arm E, fixed on the inner end thereof, the link-rod F, connecting the valve and crank-arm and extending a little beyond the forked arms of the latter, and the weighted lever G, all relatively arranged to close the valve and retain it in this adjustment under ordinary pressure by the lever dropping into a vertical position, substantially as described.

4. The valve-case A, provided with a side opening $a^3$, in combination with the head C to close said opening and provided with a stud c, extending into the casing, the shaft D, mounted in said stud, the piston-valve E, linked eccentrically to the shaft, and the weighted lever G, fitted on the outer end of the shaft, substantially as described.

WILLIAM W. DOOLITTLE.

Witnesses:
R. C. PAGE,
ALOYSIA HELMICH.